United States Patent [19]
Kubota et al.

[11] Patent Number: 5,742,451
[45] Date of Patent: Apr. 21, 1998

[54] MACHINED MAGNETIC HEAD WITH CONTOURED AIR BEARING SURFACES

[75] Inventors: Toshio Kubota, Komoro; Tetsuo Miyazaki, Nagano, both of Japan

[73] Assignee: TDK Corporation, Tokyo, Japan

[21] Appl. No.: 736,329

[22] Filed: Oct. 23, 1996

[30] Foreign Application Priority Data

Oct. 24, 1995 [JP] Japan ................................ 7-276035

[51] Int. Cl.$^6$ ..................................................... G11B 5/60
[52] U.S. Cl. ............................................................ 360/103
[58] Field of Search ..................................... 360/103, 104

[56] References Cited

U.S. PATENT DOCUMENTS

| | | | |
|---|---|---|---|
| 4,673,996 | 6/1987 | White | 360/103 |
| 4,870,519 | 9/1989 | White | 360/103 |
| 4,894,734 | 1/1990 | Fischler et al. | 360/51 |
| 5,062,017 | 10/1991 | Strom et al. | 360/103 |
| 5,087,992 | 2/1992 | Dahandeh et al. | 360/31 |
| 5,343,343 | 8/1994 | Chapin | 360/103 |
| 5,359,480 | 10/1994 | Nepela et al. | 360/103 |
| 5,396,387 | 3/1995 | Murray | 360/103 |
| 5,404,256 | 4/1995 | White | 360/103 |
| 5,414,689 | 5/1995 | Maeda et al. | 369/116 |
| 5,430,591 | 7/1995 | Takeuchi et al. | 360/103 |
| 5,488,524 | 1/1996 | Cunningham | 360/103 |
| 5,550,692 | 8/1996 | Crane | 360/103 |

FOREIGN PATENT DOCUMENTS

| | | |
|---|---|---|
| 57-122063 | 7/1982 | Japan . |
| 60-101781 | 6/1985 | Japan . |
| 61-278087 | 12/1986 | Japan . |
| 2-246067 | 10/1990 | Japan . |
| 4-30328 | 2/1992 | Japan . |
| 4-356765 | 12/1992 | Japan . |

*Primary Examiner*—Jefferson Evans
*Attorney, Agent, or Firm*—Oblon, Spivak, McClelland, Maier & Neustadt, P.C.

[57] ABSTRACT

The present invention is directed to stabilize the flying height at a constant level and prevent head crashes.

Indented portions 104 and 105 are formed shorter than rail portions 101 and 102. Rear rail surfaces 113 and front rail surfaces 112 are formed at the slider 1 with middle rail surfaces 111 formed between them. The rear rail surfaces 113 and the front rail surfaces 112 each include a first surface (L1) whose surface width is determined by the entire width W01 or W02 of the rail portion 101 or 102 and a second surface (L3) whose surface width is gradually reduced starting from the surfaces width W01 or W02 of the first (L1) toward the surface width W11 or W12 of the middle rail surfaces 111. The requirements, i.e., L1≦2.5% of L0 and L1<L2≦15% of L0 are satisfied for the length L1 of the first surfaces (L1), the length L2, that includes the first surfaces (L1) and the second surfaces (L3) and the entire length L0 of the rail portions 101 and 102.

4 Claims, 15 Drawing Sheets

MACHINED MAGNETIC HEAD WITH CONTOURED AIR BEARING SURFACES

BACKGROUND OF THE INVENTION

1. Field of the Invention

The present invention relates to a magnetic head and a magnetic read/write apparatus that incorporates this magnetic head, to be more specific, the present invention relates to a magnetic head that is machined to have air bearing surfaces with a specific contour.

2. Discussion of Background

The technology through which flying height is maintained constant from the internal circumference through the external circumference of a magnetic disk by reducing the skew angle dependency of the magnetic head in a rotary actuator system magnetic read/write apparatus is essential in improving reliability in high density recording, which requires that spacing loss be reduced by lowering the flying height, since, when the flying height is very small, the magnetic head may easily come in contact with the magnetic disk with even a very slight change in the flying height of the magnetic head during a read or write operation and this may cause problems including destruction of data on the magnetic disk.

In addition, the technology through which the flying height is made constant from the internal circumference to the external circumference of the magnetic disk and the flying attitude is also stabilized is vital for achieving a high capacity magnetic disk drive by employing zone bit recording technology. Zone bit recording technology is disclosed, for instance, in Japanese Unexamined Patent Publication (KOKAI) No. 30328/1992, U.S. Pat. No. 4,894,734 and U.S. Pat. No. 5,087,992.

As a means for responding to such requirements, various types of magnetic heads with unique contours given to their air bearing surfaces have been disclosed. For instance, Japanese Unexamined Patent Publication (KOKAI) No. 101781/1985 discloses a slider for a magnetic head in which skew angle dependency is reduced by setting the width of the rail of the slider rail at the center in the lengthwise direction smaller than the rail width at the two ends.

Japanese Unexamined Patent Publication (KOKAI) No. 356765/1992 discloses a magnetic head with air bearing surfaces provided with an inner edge and an outer edge, formed on the surfaces of rail portions, with which changes in flying characteristics relative to the skew angle are minimized by making the inner edge and the outer edge converge toward the point of inflection from the front end edge of the slider and making them diverge from the point of inflection toward the rear end edge of the slider.

Japanese Unexamined Patent Publication (KOKAI) No. 246067/1990 discloses a slider for a magnetic disk device with the width of the rail being reduced toward the trailing edge starting from the leading edge.

In addition, in a technology different from the prior art technology described above, TPC (Transverse Pressurization Contour) type sliders exist in the known art. TPC type sliders are disclosed in Japanese Unexamined Patent Publication (KOKAI) No. 278087/1986, Japanese Unexamined Utility Model Publication No. 122063/1982 (Utility Model Application No. 5818/1981), U.S. Pat. No. 4,673,996, U.S. Pat. No. 4,870,519 and the like. In a TPC slider, minute indented portions are provided at the sides of rail portions over their entire length, and when one is mounted in a rotary actuator system magnetic read/write apparatus, at positions where the skew angle is large, dynamic lift pressure is generated at the indented portions by the air flowing in from the transverse direction. This prevents any reduction in the flying height at positions where the skew angle is large so that a constant flying height is assured from the inner circumference to the outer circumference of the magnetic disk.

Of the prior art technologies explained above, TPC sliders are effective for stabilizing the flying height at a constant level. However, there is a limit to how much the flying height can be further stabilized. For instance, it is difficult to keep the flying height constant within 20 nm.

In addition, in the prior art technology above, normally, the air bearing surfaces are formed to have a desired contour by performing machining over the entire length of the rail portions. The desired contour in this case must be formed through fine machining such as dry etching, including ion milling, for instance. Because of this, in the prior art technology, which requires machining over the entire length of the rail portions, the length of the opening portions of the mask necessary for dry etching must be set larger than the entire length of the rail portions and, as a matter of course, minute particles resulting from the process of dry etching the slider become adhered to the side surfaces of the slider. The strength of adhesion of the material that becomes adhered to the slider in this manner is low. Thus, when using the magnetic head in a magnetic read/write apparatus, the material adhering to the side surfaces of the magnetic head may enter the minute flying gap between the magnetic disk and the magnetic head, and this may damage the magnetic disk irreparably.

Furthermore, bumps for the magnetic transducers are provided toward one end of the slider in the lengthwise direction. The bumps, unlike the slider, which is constituted of a hard ceramic structure, will be constituted of a soft metal material such as gold. Because of this, excessive dry etching will be performed on the bumps compared to the slider, resulting in a drop-off at the surfaces of the bumps relative to the surface of the slider. This will make connecting the lead wires for the bumps difficult.

U.S. Pat. No. 5,359,480 discloses a magnetic head air bearing slider in which each rail may be configured with two recesses. The recesses do not extend to the slider trailing edge. However, U.S. Pat. No. 5,359,480 does not necessarily disclose optimal dimensions of the recesses to stabilize the flying height at a constant level.

SUMMARY OF THE INVENTION

It is an object of the present invention to provide a magnetic head that has air bearing surfaces with a new type of contour and a magnetic read/write apparatus employing this magnetic head.

It is a further object of the present invention to provide a magnetic head and a magnetic read/write apparatus that are capable of stabilizing the flying height with a high degree of accuracy.

It is a still further object of the present invention to provide a magnetic head and a magnetic read/write apparatus that are capable of stabilizing the flying height with a high degree of accuracy even when the maximum skew angle is large.

It is a still further object of the present invention to provide a magnetic head and a magnetic read/write apparatus that are extremely effective in improving reliability in high density recording, which requires a reduction in spacing loss through lowering the flying height.

It is a still further object of the present invention to provide a magnetic head that does not cause any damage to the magnetic disk or the magnetic head due to adhered matter on the magnetic head and a magnetic read/write apparatus that employs this magnetic head.

It is a still further object of the present invention to provide a magnetic head with bumps for the magnetic transducers in which the surfaces of the bumps do not drop down from the slider surface and a magnetic read/write apparatus that employs this magnetic head.

In order to achieve the objects described above, the magnetic head according to the present invention includes a slider and a magnetic transducer. The two ends of the slider in the lengthwise direction constitute a trailing edge and a leading edge, with at least one rail portion extending in the lengthwise direction provided at one surface of the slider. The magnetic transducer is provided at the trailing edge of the slider on an extension of the rail portions.

The rail portions are provided with step-like indented portions formed along the two sides in the direction of the width. The indented portions are formed shorter than the rail portions so that rear rail surfaces are formed toward the trailing edge of the slider, front rail surfaces are formed at the leading edge of the slider and middle rail surfaces are formed between the rear rail surfaces and the front rail surfaces.

The surface width of the middle rail surfaces are maintained almost constant. The rear rail surfaces and the front rail surfaces each include a first surface whose surface width is determined by the entire width of the rail portion and a second surface whose surface width is gradually reduced starting from the surface width of the first surface toward the surface width of the middle rail surface.

When the length of the first surface is designated L1, the length that includes the first surface and the second surface is designated L2 and the entire length of the rail portion is designated L0, the requirements;

$L1 \leq 2.5\%$ of L0 and $L1 < L2 \leq 15\%$ of L0 are satisfied.

The magnetic read/write apparatus according to the present invention includes a magnetic disk, a magnetic head, a head support device and a positioning device. The magnetic disk is rotationally driven. The magnetic head is the magnetic head according to the present invention described above. The head support device supports the magnetic head at one end and the positioning device supports the head support device at the other end and causes the magnetic head to rotate on a plane at a specific angle above the surface of the magnetic disk.

The present invention may be adopted in the prior art technologies described earlier as a fine machining technology to form air bearing surfaces.

Since the slider is provided with at least one rail portion extending in the lengthwise direction at one surface and the magnetic transducers are provided at the trailing edge of the slider on extensions of the rail portions, when the present invention is employed in a magnetic read/write apparatus, a magnetic head that is capable of stabilizing the flying characteristics with the rail portions and performs magnetic write or read operations between the magnetic transducers and the magnetic disk by generating dynamic lift pressure between the magnetic disk and the air bearing surfaces constituted of the rail surfaces, is achieved.

The rail portions are provided with the step-like indented portions provided along the two sides in the direction of the width, enabling control of the flying characteristics effected by the indented portions.

The indented portions are formed shorter than the rail portions so that a rear rail surfaces are formed toward the trailing edge of the slider, front rail surfaces are formed toward the leading edge of the slider and middle rail surfaces are formed between the rear rail surfaces and the front rail surfaces. This structure is one of the important features of the present invention. With the magnetic head having this new structure, it is possible to stabilize the flying height at a constant level by controlling the length of the rear rail surfaces and the front rail surfaces remaining at the two ends in the lengthwise direction.

Moreover, since the indented portions are formed shorter than the rail portions resulting in the rear rail surfaces being formed toward the trailing edge of the slider and the front rail surfaces being formed toward the leading edge of the slider, when a mask provided with opening portions necessary for the formation of the indented portions is positioned on the surface of the slider that faces opposite the medium, for forming the indented portions through the opening portions through dry etching such as milling or the like, it is possible to set the length of the opening portions of the mask necessary for the dry etching slightly shorter than the entire length of the rail portions. This prevents minute particles from the slider resulting from the dry etching from becoming adhered to the two side surfaces of the slider. Consequently, a magnetic head and a magnetic read/write apparatus that do not damage the magnetic disk or the magnetic head because of matter adhering to the magnetic head can be achieved.

Furthermore, since the bumps are not excessively etched compared to the slider, the surfaces of the bumps do not drop down from the surface of the slider, and this ensures that difficulty in connecting the lead wire for the bumps is avoided.

Another important feature of the present invention is that the ideal lengths for the rear rail surfaces and the front rail surfaces for stabilizing the flying height at a constant level are disclosed in a specific manner. Namely, in the present invention, the surface width of the middle rail surfaces is maintained at an almost constant width. The rear rail surfaces and the front rail surfaces each include the first surface, whose surface width is determined by the entire width of the rail portion and the second surface, whose surface width is gradually reduced starting from the surface width of the first surface toward the surface width of the middle rail surface. When the length of the first surface is designated L1, the length that includes the first surface and the second surface is designated L2 and the entire length of the rail portions is designated L0, the following requirements are satisfied:

$L1 \leq 2.5\%$ of L0 and $L1 < L2 \leq 15\%$ of L0

By setting the length L1 of the first surface at or less than 2.5% of the entire length L0 of the rail portions and setting the length L2, which includes the first surface and the second surface at or less than 15% of the entire length L0 of the rail portions, the quantity of change in the flying height can be stabilized at a value that is required for practical use, i.e., a maximum of 20 nm, for instance.

In addition, by setting the length L1 of the first surface smaller than the length L2 that includes the first surface and the second surface, i.e., by providing the second surface, whose surface width is gradually reduced starting from the surface width of the first surface toward the surface width of the middle rail surfaces, when the magnetic head is being used in a magnetic read/write apparatus, no foreign matter builds up at the connecting points between the indented portions that define the middle rail surfaces and the indented portions that define the rear rail surfaces and the front rail surfaces. As a result, a magnetic head and a magnetic read/write apparatus that do not damage the magnetic disk or the magnetic head because of foreign matter build-up can be achieved.

The magnetic head and the magnetic read/write apparatus according to the present invention are driven by a rotary actuator system positioning device. According to the present invention, since an almost constant flying height is achieved even when the skew angle is increased, it is possible to set a greater range for the skew angle. Because of this, the present invention can support a compact type magnetic read/write apparatus such as is currently much called for, with a greater maximum skew angle.

When manufacturing the magnetic head according to the present invention, minute particles from the slider resulting from dry etching can be prevented from becoming adhered to the two side surfaces of the slider. As a result, it is possible to manufacture a magnetic head that does not cause damage to the magnetic disk or the magnetic head due to matter adhering to the magnetic head.

In addition, when manufacturing the magnetic head according to the present invention, since the bumps do not become excessively dry etched compared to the slider, the surfaces of the bumps do not drop down from the surface of the slider, and this ensures that connection of the lead wires for the bumps does not become difficult.

BRIEF DESCRIPTION OF THE DRAWINGS

The present invention will be described in detail with reference to the drawings in which.

DETAILED DESCRIPTION OF THE PREFERRED EMBODIMENTS

Figure 1:
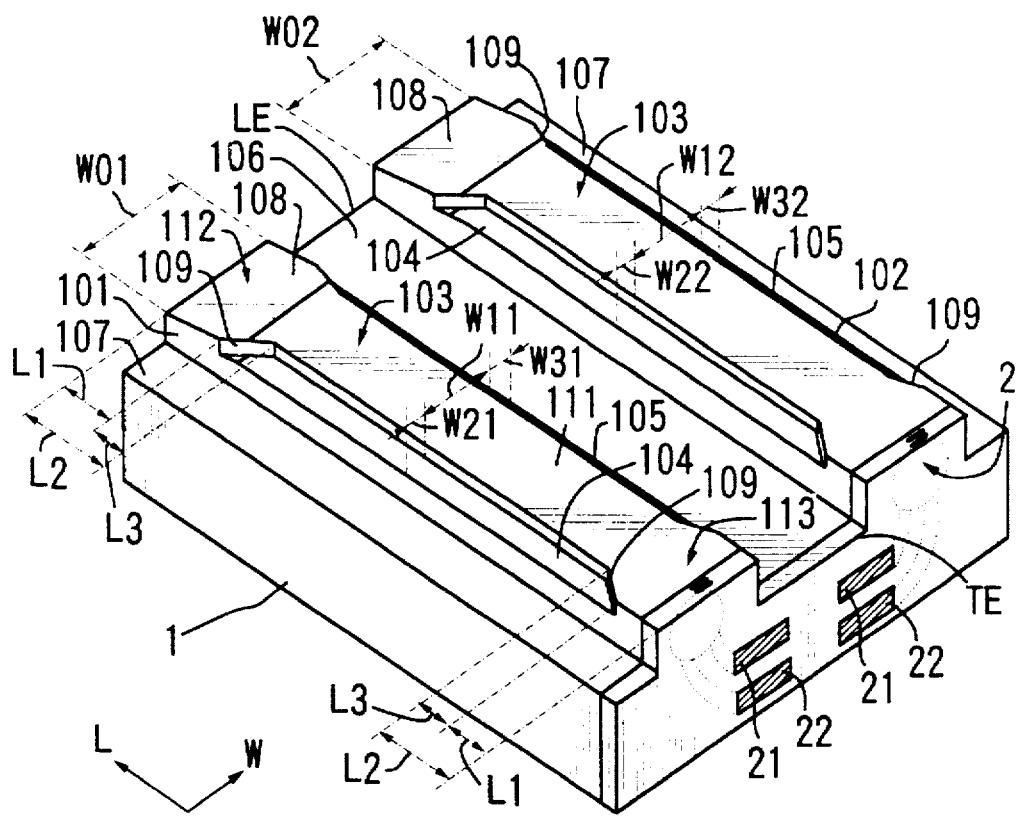
FIG. 1 is a perspective of the magnetic head according to the present invention.
Figure 2:
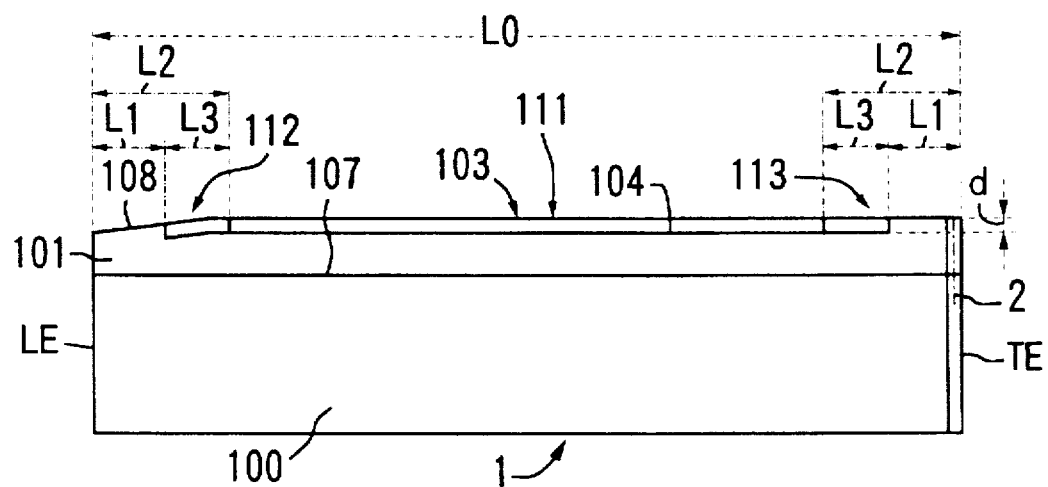
FIG. 2 is a side elevation of the magnetic head shown in FIG. 1.

With reference to FIGS. 1 and 2, whose dimensions are somewhat exaggerated, the magnetic head according to the present invention includes a slider 1 and magnetic transducers 2. The two ends of the slider 1 in the lengthwise direction L constitute a trailing edge TE and a leading edge LE and the slider 1 is provided with at least one rail portion 101 or 102 extending in the lengthwise direction L on one surface. The magnetic transducers 2 are provided toward the trailing edge TE of the slider 1 on extensions of the rail portions 101 and 102.

The rail portions 101 and 102 are each provided with step-like indented portions 104 and 105 provided along the two sides in the direction of the width W. The indented portions 104 and 105 are formed shorter than the rail portions 101 and 102. With this, rear rail surfaces 113 are formed toward the trailing edge TE of the slider 1, front rail surfaces 112 are formed toward the leading edge LE of the slider 1 and middle rail surfaces 111 are formed between the rear rail surfaces 113 and the front rail surfaces 112. The middle rail surfaces 111, the front rail surfaces 112 and the rear rail surfaces 113 constitute air bearing surfaces 103. At the rail portion 101, the indented portion 104 is formed as a step with the width W21 and depth d (see FIG. 2) whereas the indented portion 105 is formed as a step with a width W31 and depth d (see FIG. 2). Also, in the rail portion 102, the indented portion 104 is formed as a step with a width W22 and a depth d (see FIG. 2) and the indented portion 105 is formed as a step with a width W32 and a depth d (see FIG. 2). The width W21 and the width W22 may be different from each other or they may be the same. Likewise, the width W31 and the width W32 may be different from each other or they may be the same.

In the rail portion 101, the surface width W11 of the middle rail surface 111 is maintained almost constant. The rear rail surface 113 and the front rail surface 112 each include a first surface (L1) whose surface width is determined by the entire width W01 of the rail portions 101 and a second surface (L3) whose surface width is gradually reduced starting from the surface width W01 of the first surface (L1) toward the surface width W11 of the middle rail surface 111.

Likewise, in the rail portion 102, the surface width W12 of the middle rail surface 111 is maintained almost constant. The rear rail surface 113 and the front rail surface 112 each include a first surface (L1) whose surface width is determined by the entire width W02 of the rail portion 102 and a second surface (L3) whose surface width is gradually reduced starting from the surface width W02 of the first surface (L1) toward the surface width W12 of the middle rail surface 111. The width W02 and the width W02 may be equal to each other or they may be different. Likewise, the surface width W11 and the surface width W12 may be equal to each other or they may be different.

In this embodiment, as in the case of the normal structure of a magnetic head, two rail portions 101 and 102 are provided, normally parallel to each other in a typical configuration and separated by a specific distance. In this case, the distance between the rail portions 101 and 102 constitutes an indented portion 106 which drops down from the air bearing surfaces 103 and the indented portions 104 and 105. In addition, the slider 1 is provided with indented portions 107 on the two sides in the direction of the width W, which drop down from the air bearing surfaces 103 and the indented portions 104 and 105. Furthermore, the air bearing surfaces 103 are provided with tapered surfaces 108 at the end that is opposite the side surfaces where the magnetic transducers 2 are provided. The number of rail portions 101 and 102 provided may one or may be three or more. Reference numbers 21 and 22 indicate bumps.

As explained above, since the slider 1 is provided with at least one rail portion 101 or 102 extending in the lengthwise direction L at one surface and the magnetic transducers 2 are provided toward the trailing edge TE of the slider 1 on extensions of the rail portions 101 and 102, when the present invention is employed in a magnetic read/write apparatus, a magnetic head that performs magnetic write or read operations between the magnetic transducers 2 and the magnetic disk while stabilizing the flying characteristics with the rail portions 101 and 102 and generating dynamic lift pressure between the magnetic disk and the air bearing surfaces 103 is achieved.

Since the rail portions 101 and 102 are provided with the step-like indented portions 104 and 105 which are formed along the two sides in the direction of the width W, it is possible to control the flying characters with the indented portions 104 and 105. The technology whereby the flying characteristics are controlled with indented portions are disclosed in Japanese Unexamined Patent Publication (KOKAI) No. 101781/1985, Japanese Unexamined Patent Publication (KOKAI) No. 356765/1992, Japanese Unexamined Patent Publication (KOKAI) No. 246067/1990, Japanese Unexamined Patent Publication (KOKAI) No. 278087/1986, Japanese Unexamined Utility Model Publication No. 122063/1982, U.S. Pat. No. 4,673,996, U.S. Pat. No. 4,870,519 and the like.

A crucial feature of the present invention, which differentiates it from the prior art technology, is that the indented portions 104 and 105 are formed shorter than the rail portions 101 and 102 so that the rear rail surfaces 113 are formed toward the trailing edge TE of the slider 1, the front rail surfaces 112 are formed toward the leading edge LE of the slider 1 and the middle rail surfaces 111 are formed between the rear rail surfaces 113 and the front rail surfaces 112. In the magnetic head featuring this new structure, by controlling the length of the rear rail surfaces 113 and the front rail surfaces 112 at the two ends in the lengthwise direction L, the flying height can be made constant.

Furthermore, when forming the indented portions 104 and 105 by positioning a mask provided with opening portions necessary for the formation of the indented portions 104 and 105 and performing dry etching such as milling or the like through the opening portions to form the indented portions 104 and 105, the length of the opening portions of the mask required for the dry etching may be set slightly smaller than the entire length of the rail portions 101 and 102. Because of this, minute particles from the slider 1 that are produced in the dry etching process do not become adhered to the two side surfaces of the slider 1. Consequently, it is possible to provide a magnetic head and a magnetic read/write apparatus that do not cause damage to the magnetic disk or the magnetic head due to matter adhering to the magnetic head.

Moreover, since the bumps 21 and 22 do not become excessively dry etched compared to the slider 1, the surfaces of the bumps 21 and 22 do not drop down from the surface of the slider 1, thus ensuring that connecting the lead wires for the bumps 21 and 22 does not become difficult.

Another crucial feature of the present invention is that the lengths of the rear rail surfaces 113 and the front rail surfaces 112 that are optimal for stabilizing the flying height at a constant level are disclosed in a specific manner. Namely, according to the present invention, the surface widths W11 and W12 of the middle rail surfaces 111 are maintained almost constant. The rear rail surfaces 113 and the front rail surfaces 112 are provided with the first surfaces (L1) whose surface widths W01 and W02 are determined by the entire widths of the rail portions 101 and 102, respectively, and the second surfaces (L3) whose surface widths are gradually reduced starting from the surface widths W01 and W02 toward the surface widths W11 and W12, respectively, of the middle rail surfaces 111. When the length of the first surface (L1) is designated L1, the length that includes the first surface (L1) and the second surface (L3) is designated L2 and the entire length of the rail portions 101 and 102 is designated L0, the following requirements are satisfied:

L1≦2.5% of L0

L1<L2≦15% of L0

By setting the length L1 of the first surfaces (L1) at or less than 2.5% of the entire length L0 of the rail portions 101 and 102 and setting the length L2 that includes the first surfaces (L1) and the second surfaces (L3) at or less than 15% of the entire length L0 of the rail portions 101 and 102, it is possible to stabilize the flying height at a value required in practical use, i.e., at or less than 20 nm, for instance.

Furthermore, by setting the length L1 of the first surfaces (L1) smaller than the length L2 that includes the first surfaces (L1) and the second surfaces (L3), i.e., by providing the second surfaces (L3) whose surface width is gradually reduced starting from the surface width of the first surfaces (L1) toward the surface width of the middle rail surfaces 111, when the magnetic head is being used in a magnetic read/write apparatus, no build up of foreign matter occurs in the vicinity of the connecting point between the indented portions 104 and 105 defining the middle rail surfaces 111 and the indented portions 104 and 105 defining the rear rail surfaces 113 and the front rail surfaces 112. As a result, a magnetic head and a magnetic read/write apparatus which do not cause damage to the magnetic disk or the magnetic head due to dirt build up can be achieved.

Preferably, the length L1 of the first surfaces (L1) should be set at or more than 10 µm. By doing so, dry etching can be performed using a mask which covers the trailing edge TE and the leading edge LE of the rail portions 101 and 102 over a length of 10 µm or more. The minimum value of the mask cover that reliably prevents minute particles from the slider 1 resulting from the dry etching process from becoming adhered to the two side surfaces of the slider 1 at the trailing edge TE and the leading edge LE of the rail portions 101 and 102 and can reliably avoid dry etching of the side surface of the slider 1 where the bumps 21 and 22 are provided, is approximately 10 μm after taking into consideration machining tolerance. Consequently, being able to perform dry etching by using a mask that covers the trailing edge TE and the leading edge LE of the rail portions 101 and 102 over a length of 10 μm or more ensures that minute particles from the slider 1 resulting from the dry etching process are reliably prevented from becoming adhered to the two side surfaces of the slider 1 and that the side surfaces of the slider 1 where the bumps 21 and 22 are provided can be reliably prevented from becoming dry etched.

In addition, as the data, which are to be explained in more detail later, indicate, when the length L1 of the first surfaces (L1) increases, the flying height increases, which, in turn, increases the change in the flying height. The purpose of setting the length L1 of the first surface (L1) at 10 μm or more in the present invention is to clearly define the limit at which the flying height and changes in the flying height can be minimized while adhesion of particles is prevented.

The magnetic head shown in FIGS. 1 and 2 represents an example of a TPC magnetic head. With a magnetic head provided with a TPC slider, when it is mounted in a rotary actuator system magnetic read/write apparatus, dynamic lift pressure is generated at the indented portions 104 and 105 with the air flowing in from the transverse direction at positions where the skew angle is great and with this, reduction in the flying height at positions where the skew angle is great is prevented, making it possible to assure a constant flying height from the inner circumference through the outer circumference of the magnetic disk.

In a TPC slider with the air bearing surfaces 103 facing upward, if the side surface of the slider 1 where the magnetic transducers 2 are provided is set as the front surface, the indented portions 104 are on the left of the air bearing surfaces 103 and the indented portions 105 are on the right. In this structure, it is preferable that the depth d of the indented portions 104 and 105 be set at approximately 0.7 μm. This will ensure that the advantages of the TPC slider can be utilized in a satisfactory manner.

For the magnetic transducers 2, an induction type element, an MR (magnetoresistive effect) type, a combination of these or the like maybe used. These elements may be constituted with thin film elements formed through a process similar to that in IC manufacturing technology. In addition, not only the in-plane recording method, but the vertical recording method may be employed.

Figure 3:
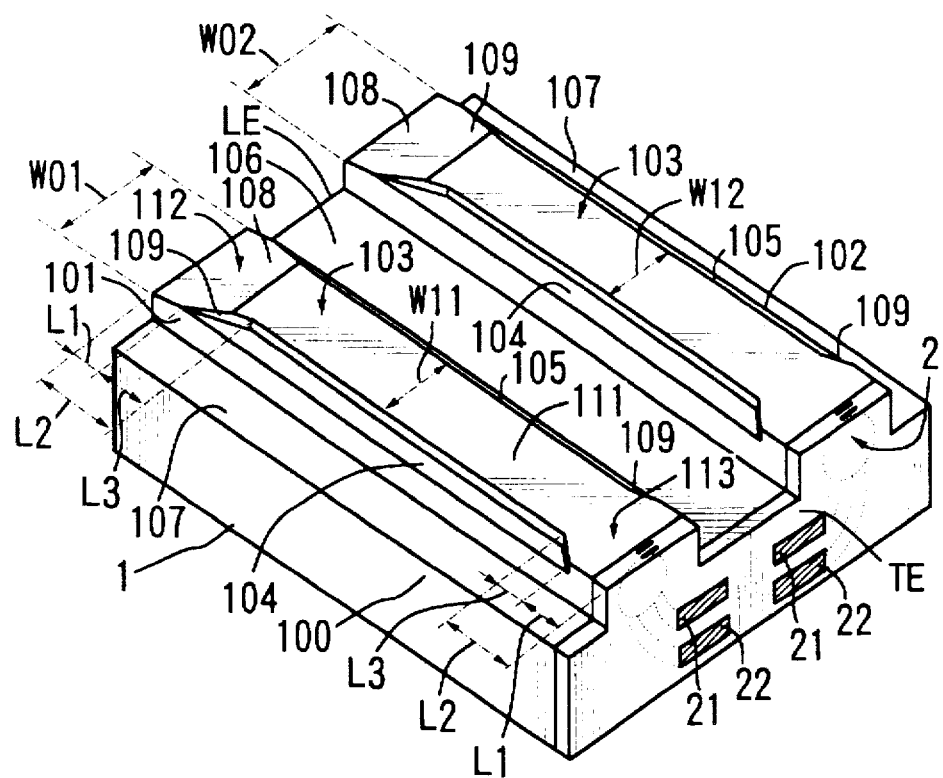
FIG. 3 is a perspective of another embodiment of the magnetic head according to the present invention.
Figure 4:
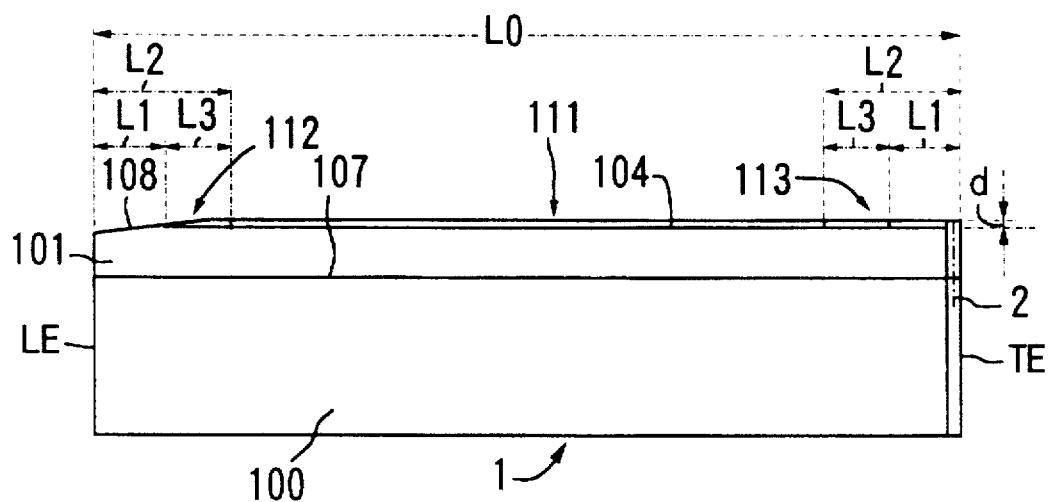
FIG. 4 is a side elevation of the magnetic head shown in FIG. 3.

FIG. 3 is a perspective of another embodiment of the magnetic head according to the present invention and FIG. 4 is a side elevation of the magnetic head shown in FIG. 3. In these figures, the same reference numbers as those used in FIGS. 1 and 2 indicate identical components. In this embodiment, the bottom surfaces of the indented portions 104 and 105 each constitute a single flat surface.

Figure 5:
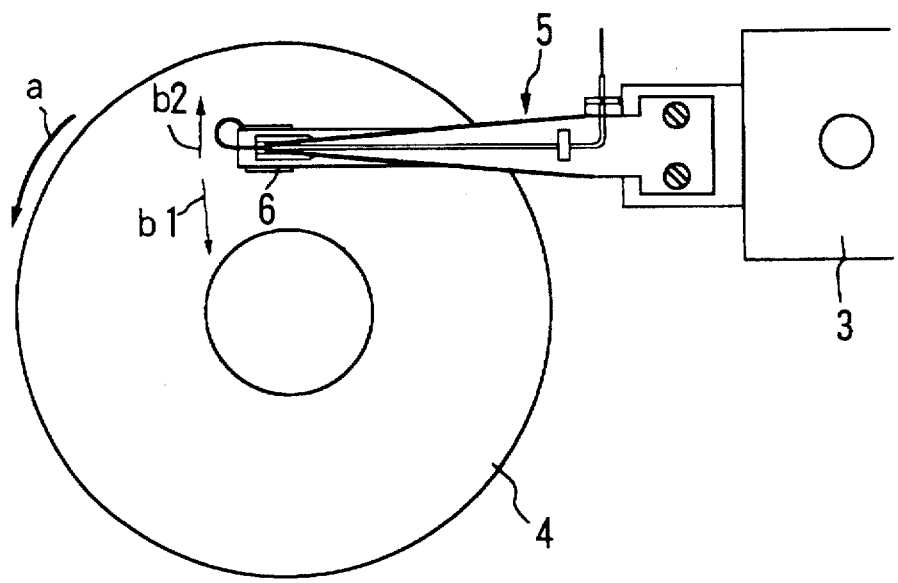
FIG. 5 is a plan view of the magnetic read/write apparatus according to the present invention.

FIG. 5 shows the magnetic read/write apparatus according to the present invention. The magnetic read/write apparatus according to the present invention includes a positioning device 3, a magnetic disk 4, a head support device 5 of the known art and the magnetic head 6 according to the present invention. The magnetic disk 4 is rotationally driven in the direction indicated with the arrow a by a rotational drive mechanism (not shown). The positioning device 3, which employs the rotary actuator system, supports one end of the head support device 5 and drives it in the direction indicated with the arrow b1 or b2 at a specific angle (skew angle) above the surface of the magnetic disk 4. With this, write to or read from the magnetic disk 4 is performed on a specific track.

Figure 6:
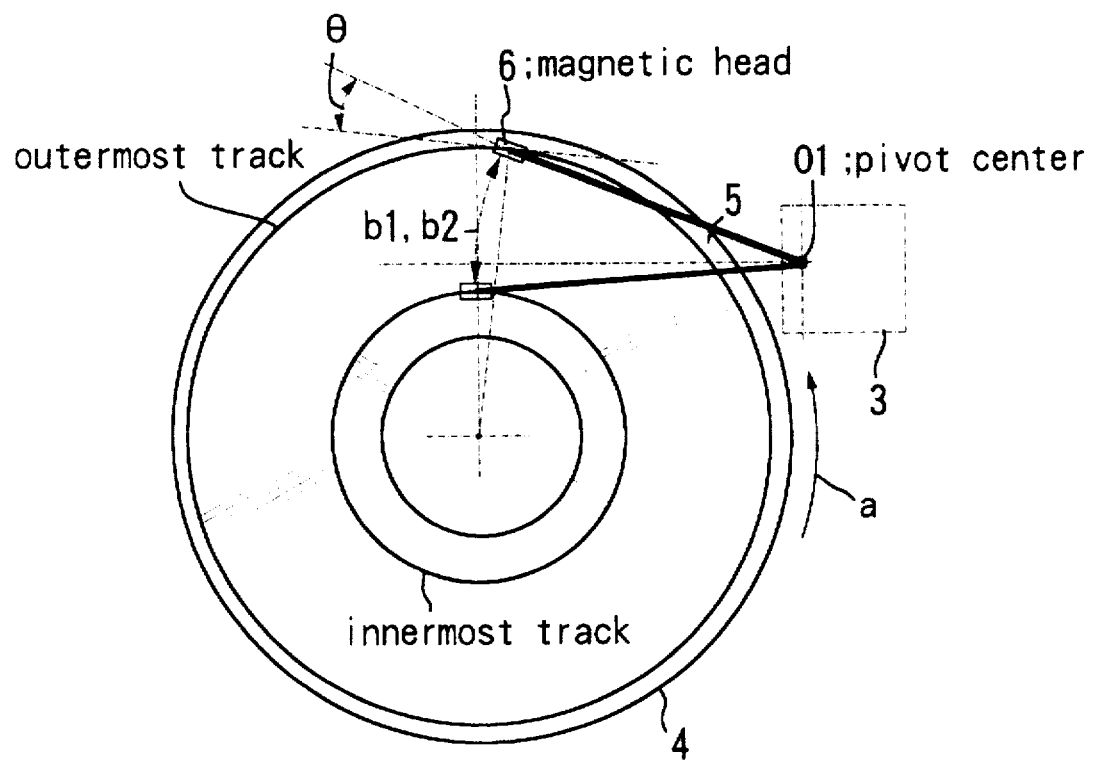
FIG. 6 is an illustration of the operation of the magnetic read/write apparatus shown in FIG. 5.

FIG. 6 illustrates the operation of the magnetic read/write apparatus shown in FIG. 5. During a read/write operation, the head support device 5, which supports the magnetic head 6, is driven in such a manner that it is swung in the directions indicated with the arrows b1 and b2 around the pivot center 01 by the rotary actuator system positioning device 3. The position of the magnetic head 6 on the magnetic disk 4 is normally expressed as a skew angle.

Figure 7:
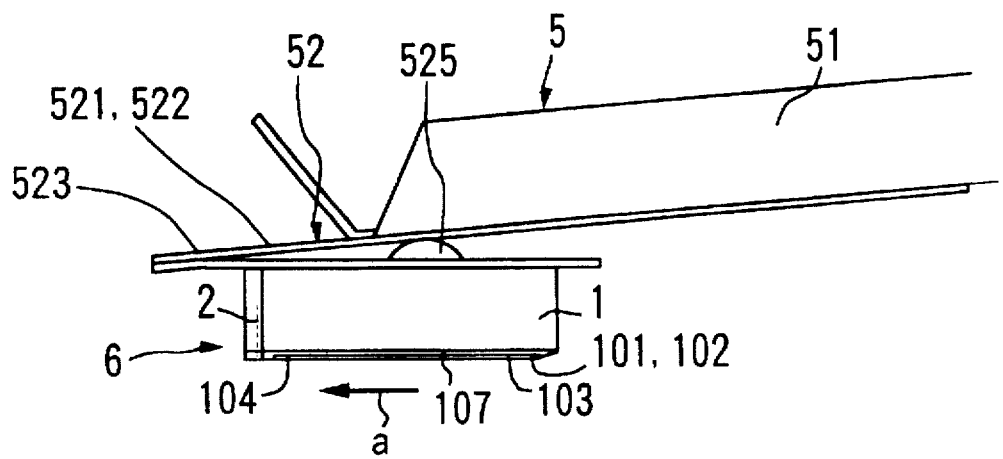
FIG. 7 is a side elevation of the magnetic head device that is one of the constituents of the magnetic read/write apparatus according to the present invention.
Figure 8:
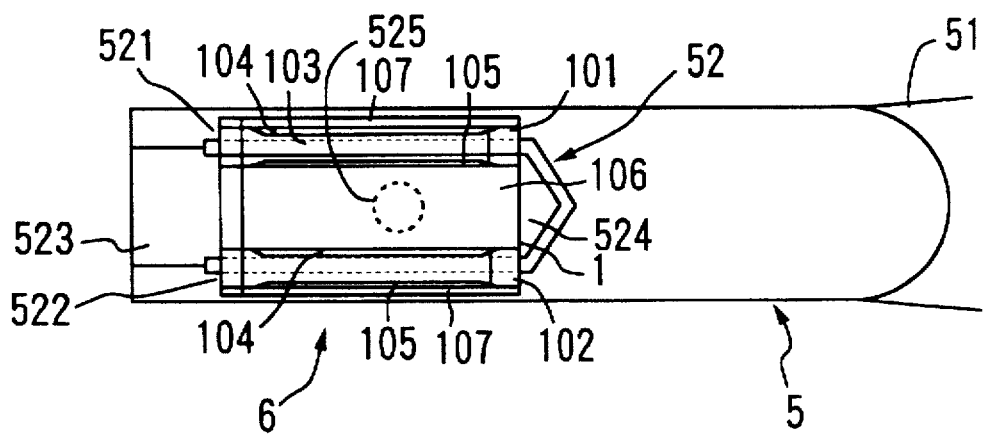
FIG. 8 is a bottom view of the magnetic head device that is one of the constituents of the magnetic read/write device according to the present invention.

FIG. 7 is a side elevation of the magnetic head device and FIG. 8 is its bottom view. The head support device 5 has a structure in which, at a free end located at one end of a supporting body 51 constituted of a thin metal plate in its lengthwise direction, a flexible body 52, also constituted of a thin metal plate, is mounted with the magnetic head 6 mounted at the lower surface of the flexible body 52. The head support device 5 imparts a load force to press the magnetic head 6 toward the magnetic disk 4. The flexible body 52 in the figures is provided with two outer frame portions 521 and 522 that extend almost parallel to the lengthwise axis of the supporting body 51, a transverse frame 523 that links the outer frame portions 521 and 522 at an end distanced from the supporting body 51 and a tongue piece 524 that extends from approximately the center of the transverse frame 523 and runs almost parallel to the outer frame portions 521 and 522 with its front end left as a free end. One end that is opposite from the direction in which the transverse frame 523 is provided is mounted in the vicinity of the free end of the supporting body 51 by means such as welding.

On the upper surface of the tongue piece 524 of the flexible body 52, a projection for load 525 is provided, which may be formed, for instance, in a semi-spherical shape. With this projection for load 525, a load force is communicated from the free end of the supporting body 51 to the tongue piece 524.

The magnetic head 6 is mounted at the lower surface of the tongue piece 524 by means such as welding. The magnetic head 6 is mounted at the magnetic head support device 5 so that its lengthwise direction aligns with the lengthwise direction of the head support device 5. The head support device 5 that can be employed in the present invention is not limited to that in the embodiment described above. A number of head support devices that have been disclosed in the past or that may be disclosed in the future can be adopted.

Figure 9:
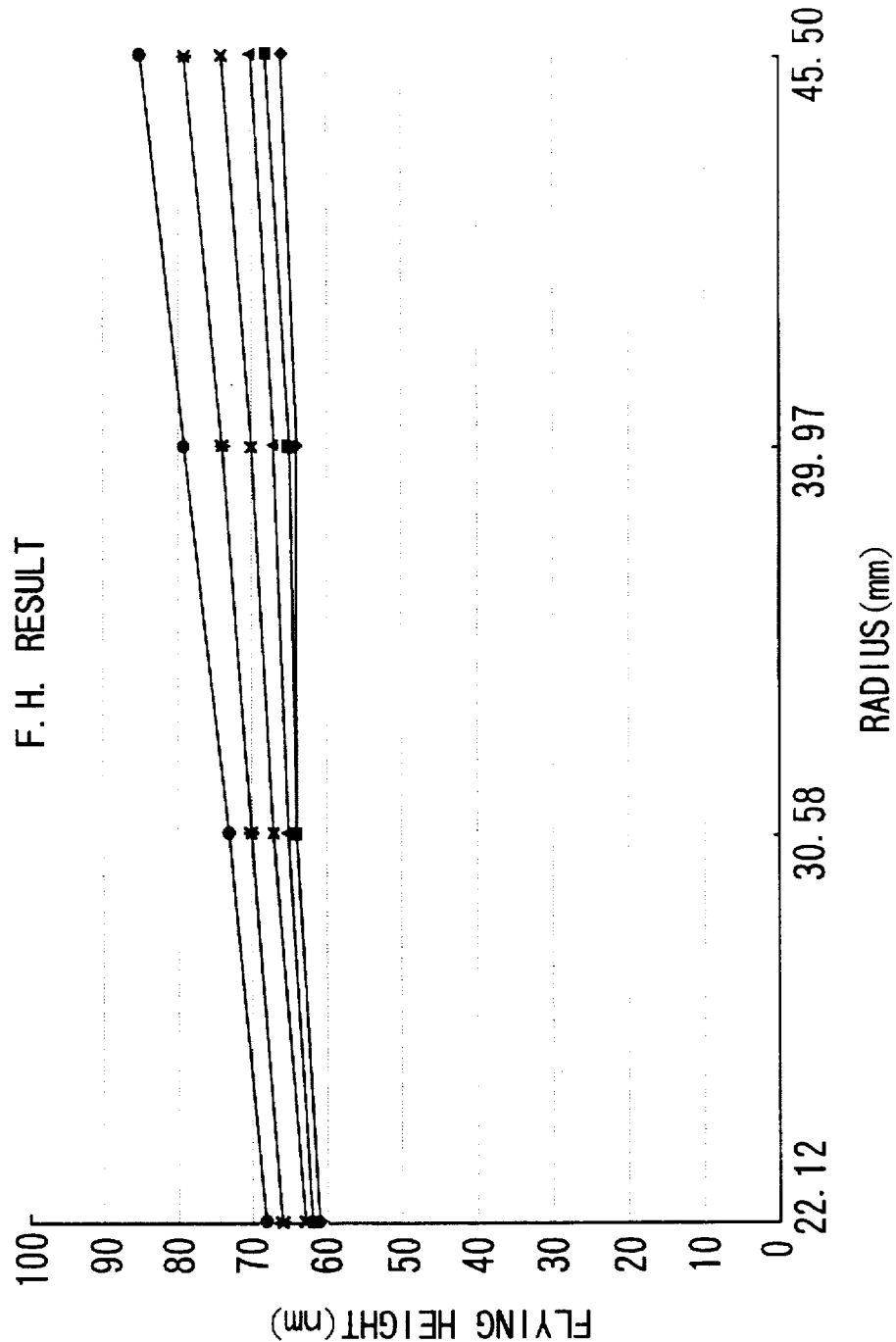
FIG. 9 is a graph showing the change in the flying height when the length L1 of the first surfaces (L1) is set at 50 μm and the length L2 is varied in the magnetic head according to the present invention.
Figure 10:
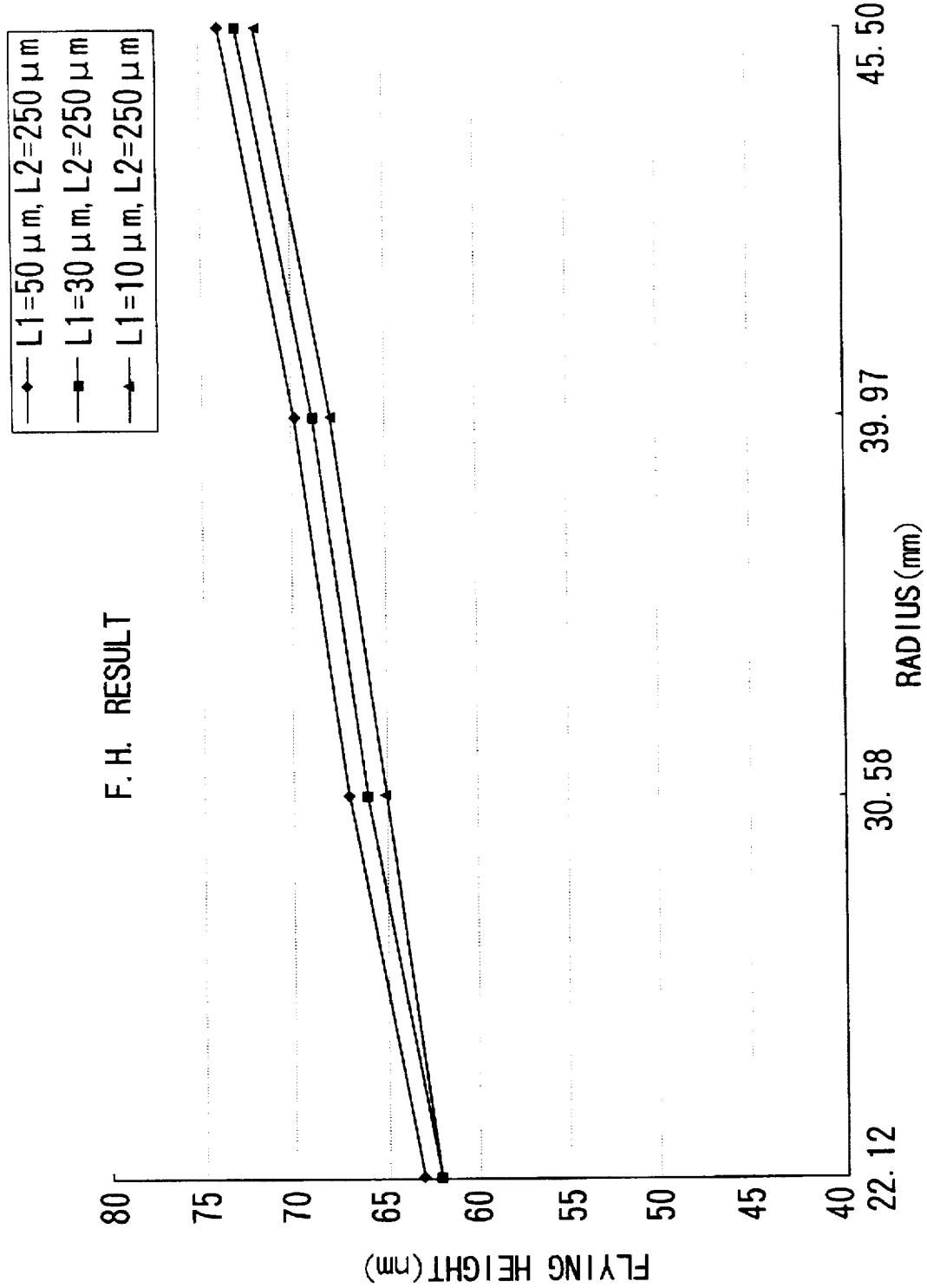
FIG. 10 is a graph showing the change in the flying height when the length L2 is set at 250 μm and the length L1 is varied in the magnetic head according to the present invention.
Figure 11:
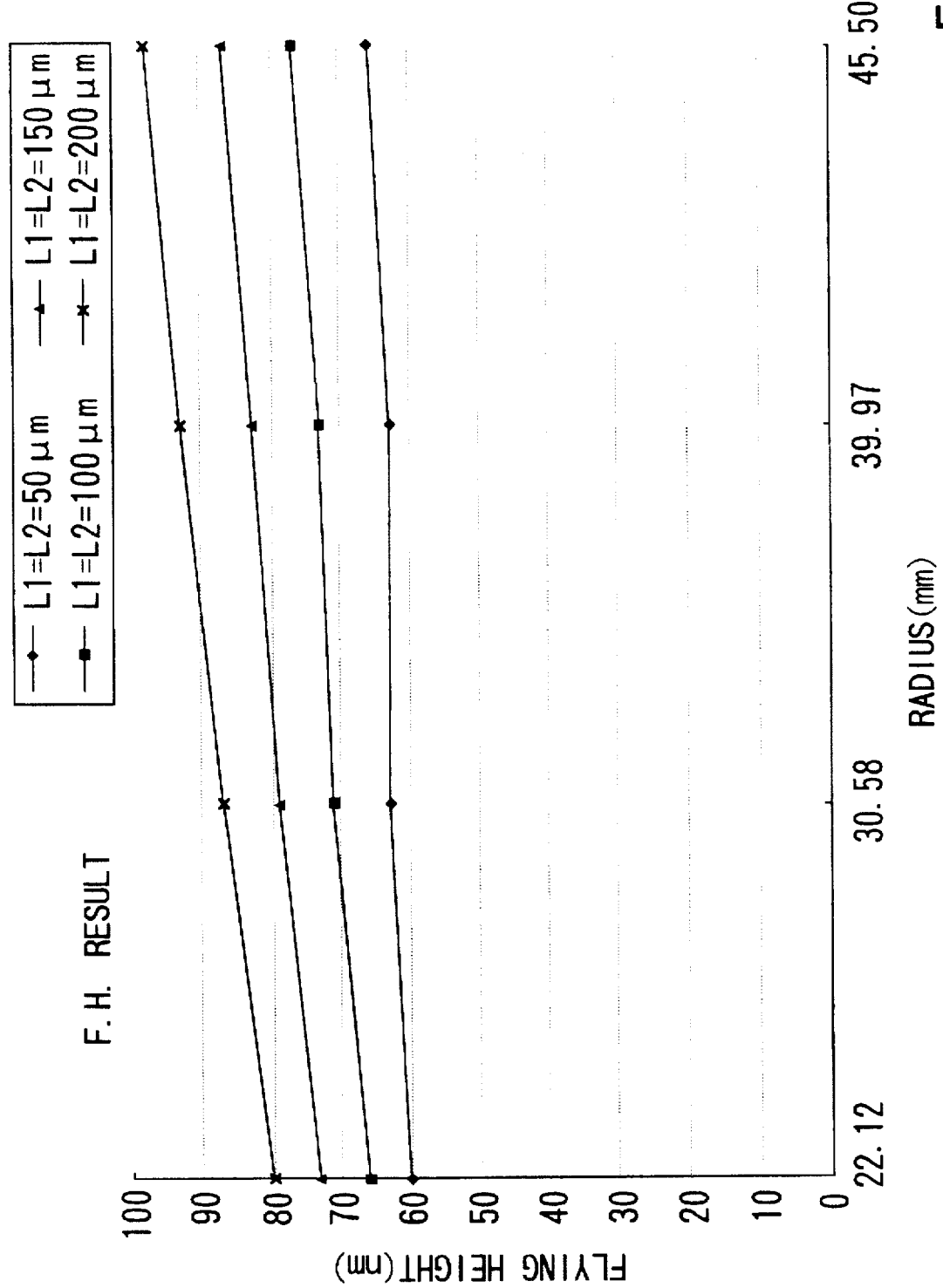
FIG. 11 is a graph showing the change in the flying height in the magnetic head shown in FIG. 12 when the length L1 is varied.

Next, in reference to the measured data, advantages achieved by the magnetic head and the magnetic read/write apparatus according to the present invention are explained. The measured data in FIGS. 9, 10 and 13 are obtained when the magnetic read/write apparatus shown in FIGS. 5 to 8 is constituted by employing the magnetic head shown in FIGS. 1 and 2. The measured data in FIG. 11 are obtained when the magnetic read/write apparatus shown in FIGS. 5 to 8 is constituted by employing the magnetic head shown in FIG. 12, which is outside the scope of the present invention.

A 3.5 inch magnetic disk is used and is caused to rotate at a rotation rate of 4090 rpm. In FIGS. 9, 10, 11 and 13, a measured radius on the magnetic disk is used for the horizontal axis and the flying height is used for the vertical axis. The relationship between the measured radius and the skew angle is as follows:

measured radius (mm); 22.1 30.6 40.0 45.5 skew angle (°); 1.2 −7.3 −15.1 −19.3

The specifications of the slider are as follows:
(a) external dimensions; 2.00×1.60×0.43 (mm)
(b) widths of various parts of the rail portion 101;
W11=174 μm
W21=136 μm
W31=36 μm
(c) widths of various parts of the rail portion 102;
W12=165 μm
W22=144 μm
W32=38 μm
(d) depth d of the indented portions 104 and 105 d=0.76 μm FIG. 9 shows the change in the flying height when the length L1 of the first surfaces (L1) and the length L2 that includes the first surfaces (L1) and the second surfaces (L3) are set equal to each other both in the front rail surfaces 112 and the rear rail surfaces 113. The length L1 is set at 50 μm and the length L2 is varied. In a magnetic read/write apparatus using a 3.5 inch magnetic disk, the change in flying height only has to be kept at or less than 20 nm in practical use. FIG. 9 shows that the change in flying height is maintained at or less than 15 nm in the range over which the length L2 is at or less than 300 μm when L1=50 μm. Since, as described earlier, the entire length L0 of the slider is 2.00 mm, L1=50 μm satisfies the requirement L1≦2.5% of L0, and L2=300 μm satisfies the requirement L2<15% of L0. Within this range, the change in flying height is maintained at or less than 15 nm in a magnetic read/write apparatus employing a 3.5 inch magnetic disk, which satisfactorily meets the requirements imposed for practical use, i.e., the change in flying height at or less than 20 nm.

FIG. 10 shows the change in flying height when the length L1 of the first surfaces (L1) and the length L2 that includes the first surfaces (L1) and the second surfaces (L3) are set equal to each other at the front rail surfaces 112 and the rear rail surfaces 113, the length L2 is set at 250 μm and the length L1 is varied. As FIG. 10 indicates, the more the length L1 of the first surfaces (L1) is reduced, the smaller the change in flying height. As a result, in order to stabilize the flying height at a constant level, the length L1 of the first surfaces (L1 ) must be reduced.

Figure 12:
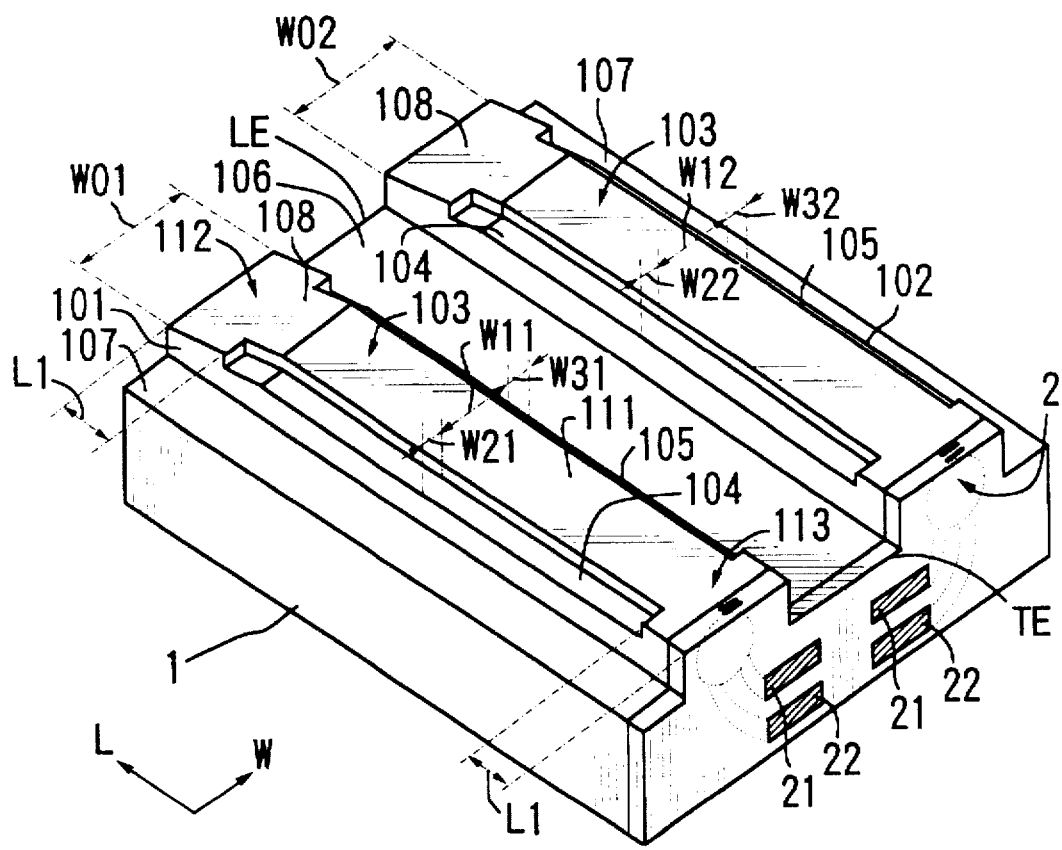
FIG. 12 is a perspective of the magnetic head employed to obtain the data presented in FIG. 11.
Figure 13:
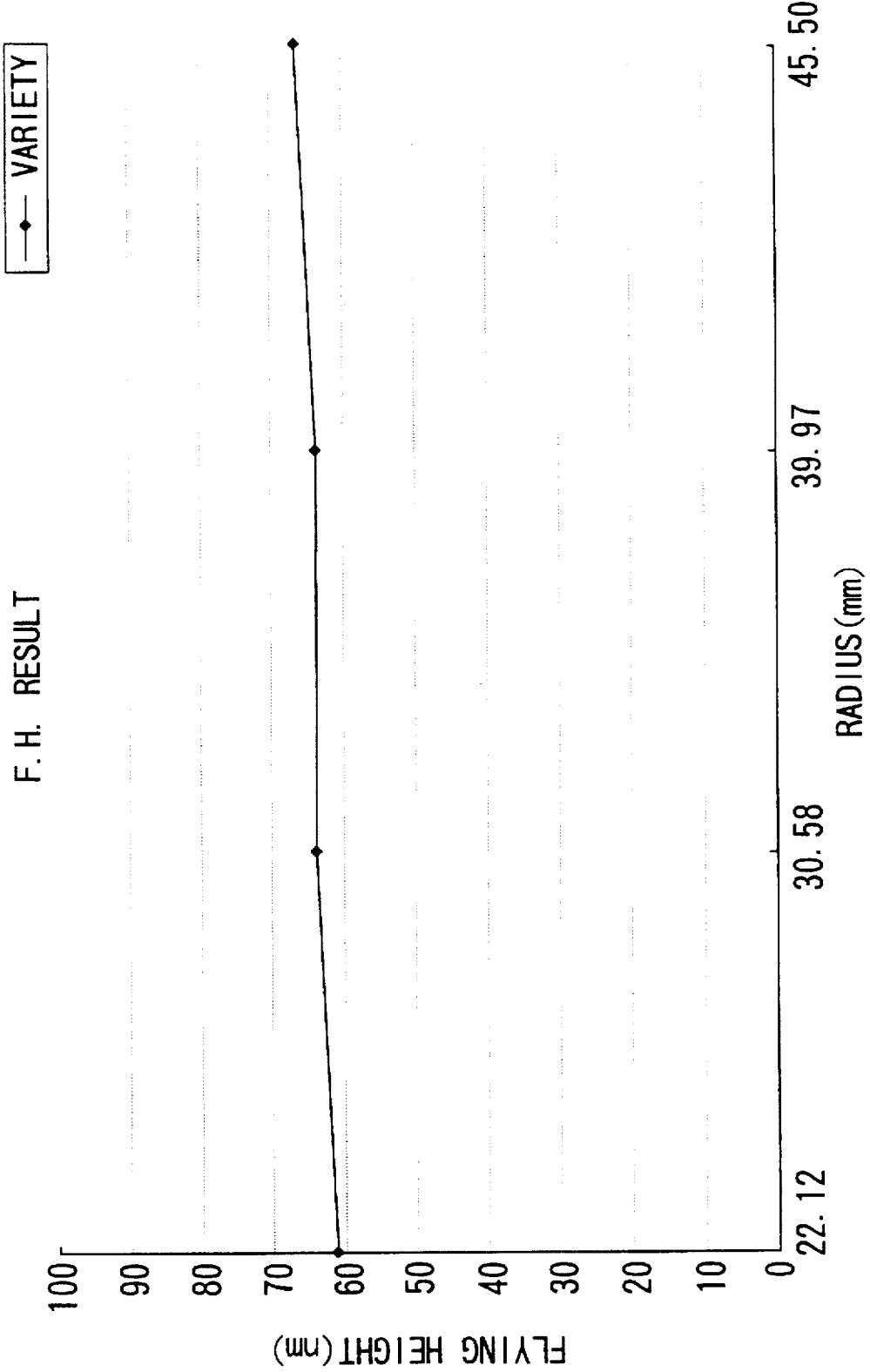
FIG. 13 is a graph showing the flying characteristics achieved when the magnetic head shown in FIG. 14 is employed to constitute the magnetic read/write apparatus shown in FIGS. 5 to 8.

FIG. 11 shows the change in flying height when the length L1 is varied in the magnetic head shown in FIG. 12. In FIG. 12, there is no second surface (L3) either at the front rail surfaces 112 or at the rear rail surfaces 113 with L3 being equal to 0. FIG. 11 demonstrates that, in the case of the magnetic head shown in FIG. 12, the greater the length L1 of the first rail surfaces (L1), the greater the flying height. In addition, the figure indicates that, since the change in flying height is great, it is not possible to stabilize the flying height at a constant level. During the process of acquiring the data shown in FIG. 11, magnetic head crashes occurred frequently between the magnetic disk and the magnetic head. When the magnetic heads that experienced a head crash were examined, dust was observed adhering to the corners of the indented portions 104 and 105 toward the rear rail surfaces 113 along the indented portions 104 and 105. This leads to the conclusion that it is necessary to provide second rail surfaces (L3) as well as the first rail surfaces (L1), to ensure that L2>L1.

Figure 14:
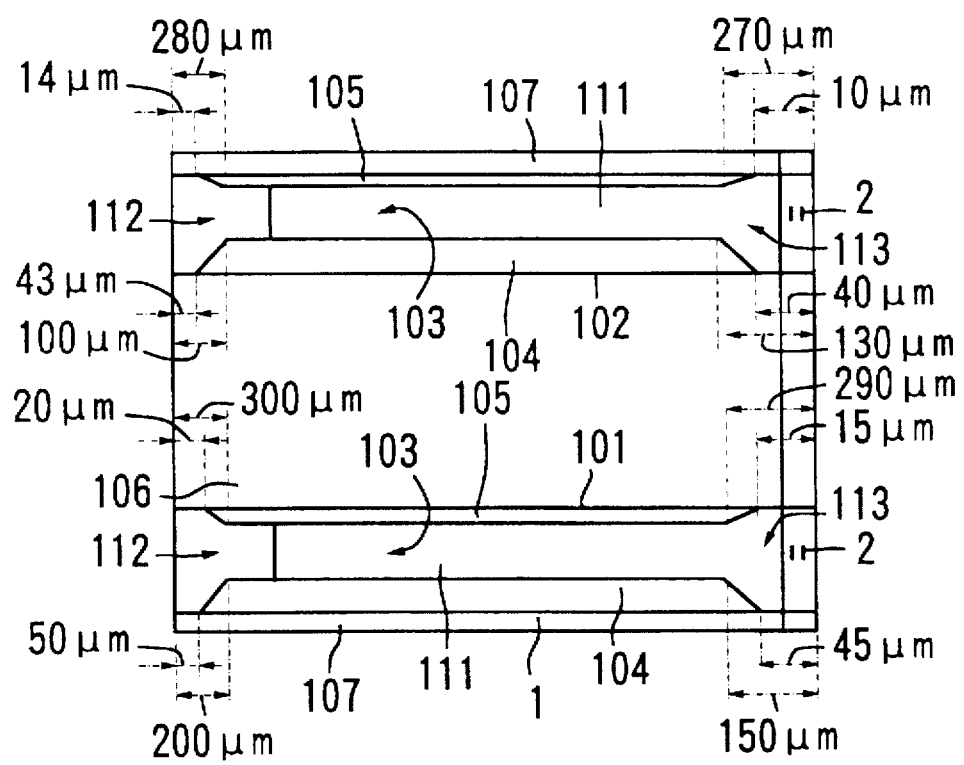
FIG. 14 is a bottom view of the magnetic head employed to obtain the data presented in FIG. 13.

FIG. 13 shows the flying characteristics that are achieved when the magnetic head shown in FIG. 14 is employed to constitute the magnetic read/write apparatus shown in FIGS. 5 to 8. In FIG. 14, the length L1 of the first surfaces (L1) and the length L2 that is determined by the first surfaces (L1) and the second surfaces (L3) are varied to a number of values at the trailing edge TE and at the leading edge LE of the rail portions 101 and 102 within the range defined by the present invention. With this magnetic head, too, stabilized flying height can be achieved, as indicated in FIG. 13.

Figure 15:
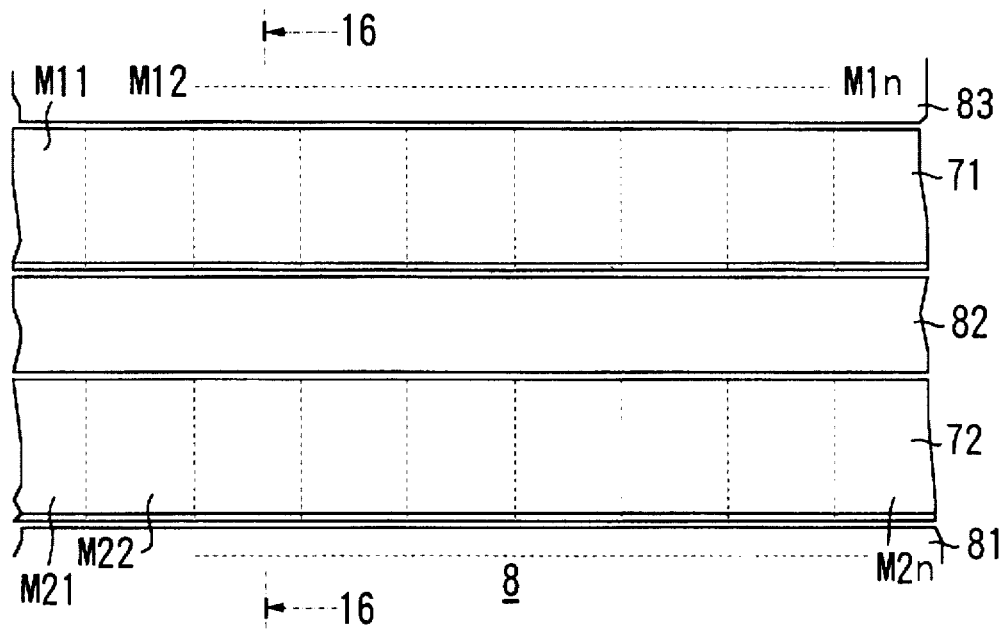
FIG. 15 is a plan view showing the first process included in the magnetic head manufacturing method.
Figure 16:
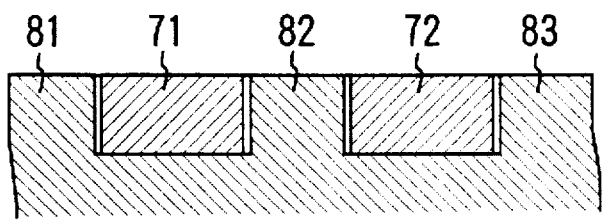
FIG. 16 is a cross section through line 16—16 in FIG. 15.

Next, method for manufacturing the magnetic head according to the present invention is explained in reference to FIGS. 15 to 25. In order to manufacture the magnetic head described above, the magnetic head manufacturing method includes the following processes. First, in a first process, magnetic head aggregates 71 and 72 are positioned on a supporting body 82 as illustrated in FIGS. 15 and 16. The magnetic head aggregates 71 and 72 are constituted by arraying a plurality of magnetic head elements (M1*l* to M1*n*) and (M2*l* to M2*n*) in one direction, and are positioned on the supporting body 82 with the surfaces of the magnetic head elements (M1*l* to M1*n*) and (M2*l* to M2*n*) that are to face opposite the medium, facing front. Each of the magnetic head elements (M1*l* to M1*n*) and (M2*l* to M2*n*) is arrayed in such a manner that the magnetic transducers 2 are positioned at one end in the direction of the width when the direction of the array is set as the lengthwise direction. Unlike the arrangement in the figures, the magnetic head aggregates 71 and 72 may be placed in contact on a flat supporting body 82. In addition, it is desirable that a process for polishing the air bearing surfaces and a process for rendering tapered surfaces to the air bearing surfaces (see FIG. 1) should precede the first process.

Figure 17:
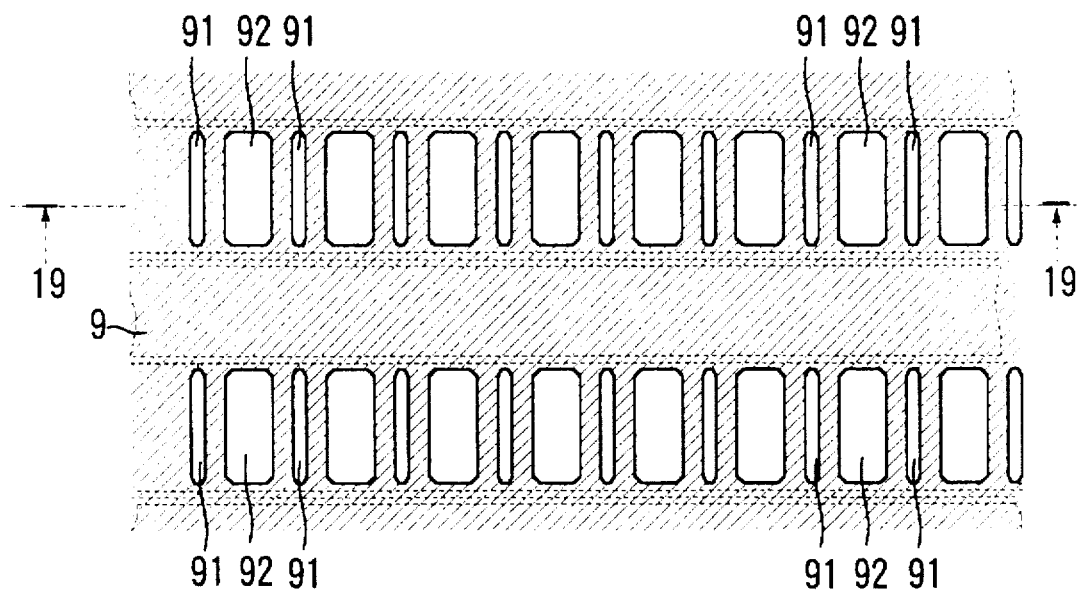
FIG. 17 is a plan view showing the second process included in the magnetic head manufacturing method.
Figure 18:
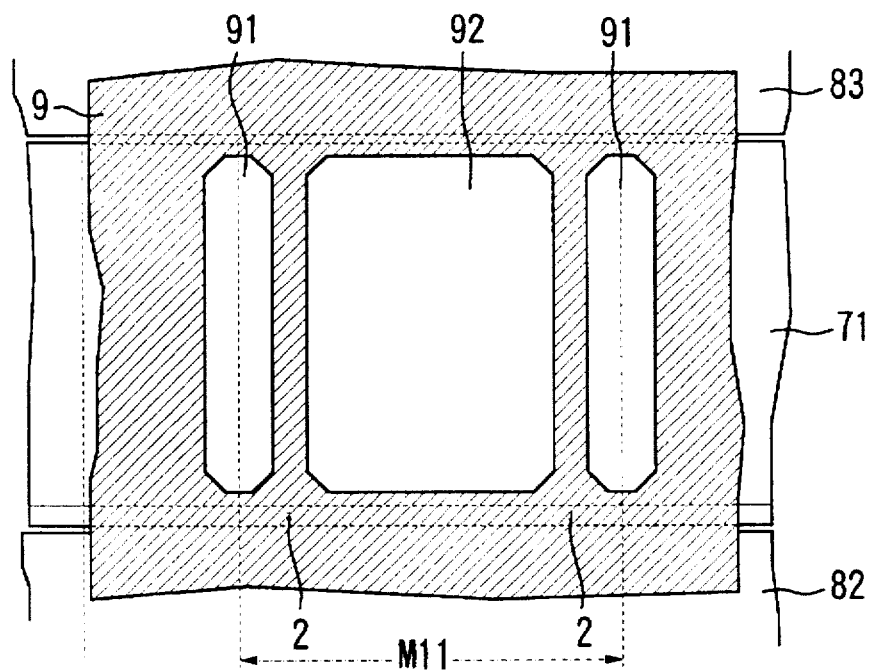
FIG. 18 is a partial enlargement of FIG. 17.

In a second process, which follows the first process, a mask 9 is placed on the surfaces of the magnetic head aggregates 71 and 72, which have been positioned during the first process, as illustrated in FIGS. 17 and 18. The mask 9 is provided with at least opening portions 91 and 92 at positions that correspond to the indented portions. The range over which and the positions of which the opening portions 91 and 92 open only within the surfaces of the magnetic head aggregates 71 and 72 are determined in advance.

Figure 19:
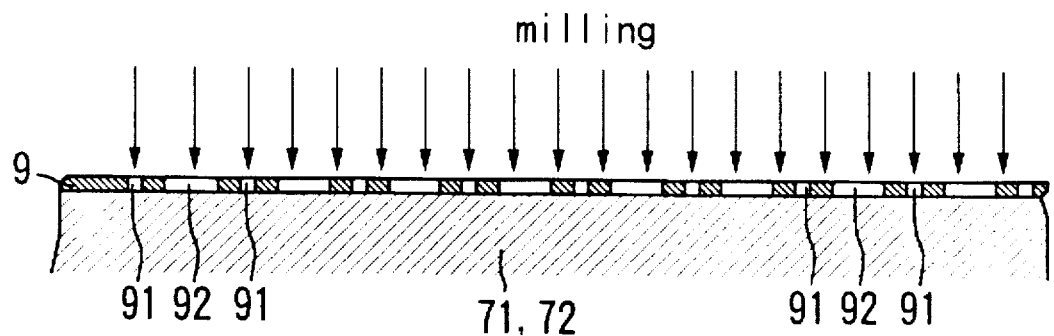
FIG. 19 is a cross section through line 19—19 in FIG. 17, showing the third process included in the magnetic head manufacturing method.

In a third process, as shown in FIG. 19, following the second process, dry etching is performed on the surfaces of the magnetic head aggregates 71 and 72 through the opening portions 91 and 92 to form indented portions. A typical example of dry etching is milling. At this point, since the mask 9 is provided with the opening portions 91 and 92 at positions corresponding to the indented portions and the ranges over which and the positions at which the opening portions 91 and 92 open only within the surfaces of the magnetic head aggregates 71 and 72 are determined in advance, minute particles from the slider resulting from the dry etching performed in the third process can be prevented from becoming adhered to the two side surfaces of the magnetic head aggregates 71 and 72 that constitute the slider. As explained earlier, the minimum value of the mask cover that can reliably assure that minute particles from the magnetic head aggregates 71 and 72 resulting from dry etching do not become adhered to the two side surfaces of the magnetic head aggregates 71 and 72 and also allows reliable prevention of dry etching of the side surfaces of the magnetic head aggregates 71 and 72 is approximately 10 μm, even after taking into consideration machining tolerance. As a result, by selecting a value of 10 μm or over for the mask cover, it is possible to manufacture a magnetic head that does not cause any damage to the magnetic disk or the magnetic head due to matter adhering to the magnetic head. In addition, since the bumps do not become excessively dry etched compared to the slider, the surfaces of the bumps do not drop down from the surfaces of the magnetic head aggregates 71 and 72 constituting the slider, which, in turn, ensures that connecting the lead wires for the bumps does not become difficult.

Figure 20:
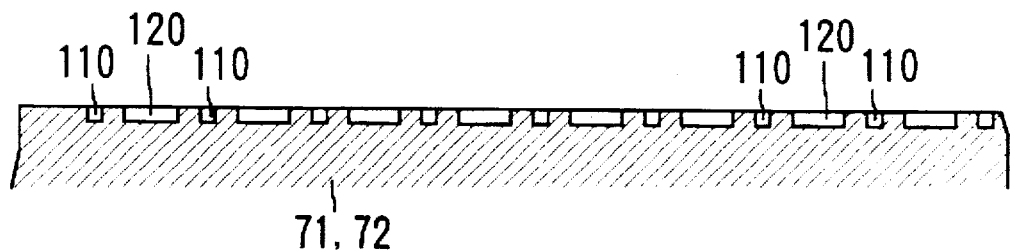
FIG. 20 is a cross section of the magnetic head aggregate obtained by performing the second process and the third process.
Figure 21:
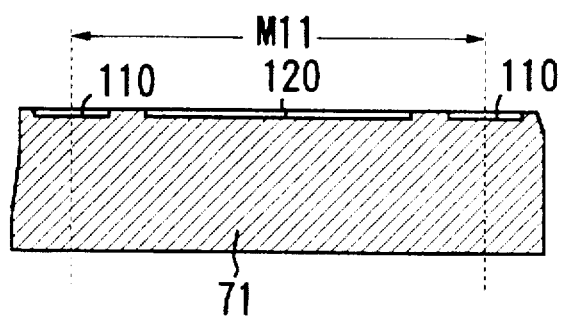
FIG. 21 is an enlarged partial cross section of the magnetic head aggregates shown in FIG. 20.

By undergoing the third process, the indented portions 110 and 120 are formed as shown in FIGS. 20 and 21.

Figure 22:
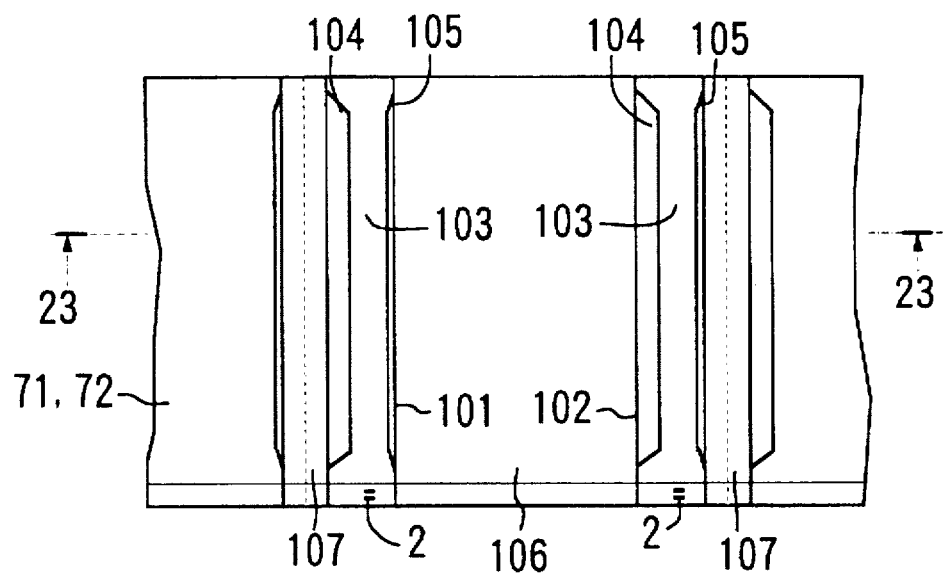
FIG. 22 is a plan view showing the fourth process included in the magnetic head manufacturing method.
Figure 23:
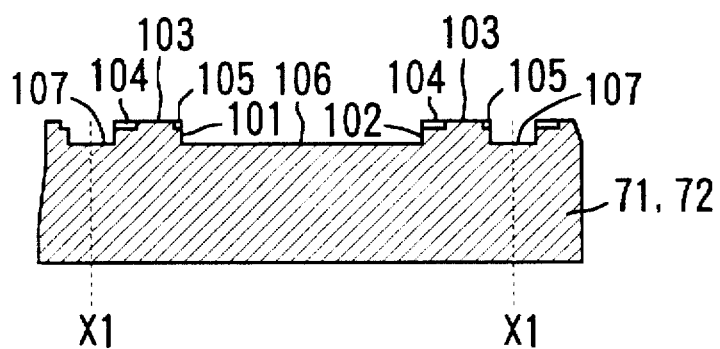
FIG. 23 is a cross section through line 23—23 in FIG. 22.

In a fourth process, which follows the third process, necessary machining is performed on the magnetic head while leaving the indented portions 110 and 120 intact. The main sub-processes included in the fourth process are a sub-process in which a third step and a fourth indented portion (see FIG. 1) are formed through machining and a sub-process in which separate magnetic head elements are taken out through cutting. FIGS. 22 and 23 show the sub-process through which steps 106 and 107 are formed through machining during the fourth process. This machining also creates the indented portions 104 and 105.

Figure 24:
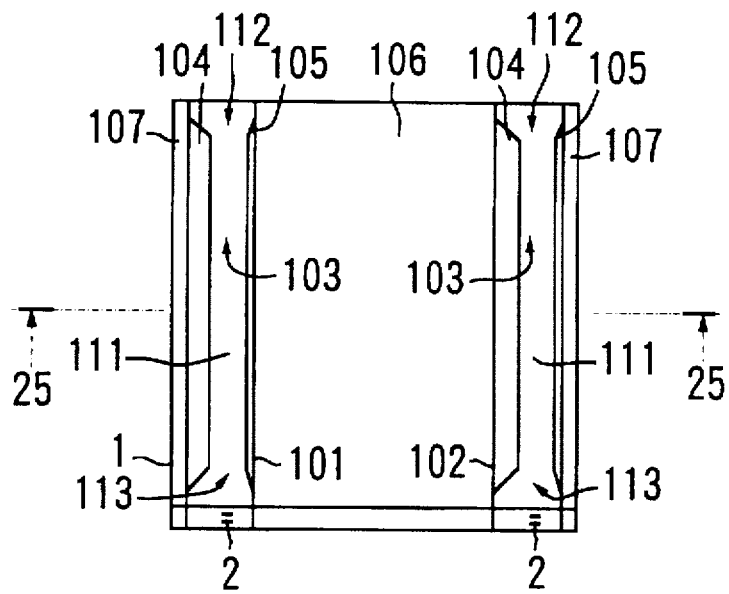
FIG. 24 is a plan view showing the fourth process included in the magnetic head manufacturing method.
Figure 25:
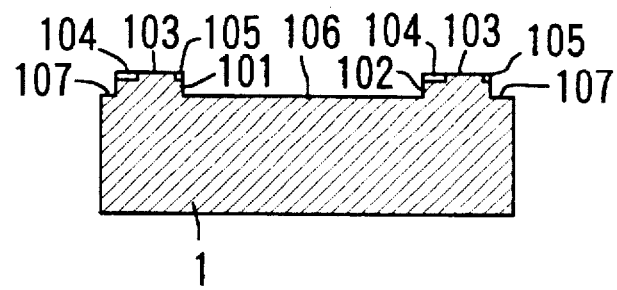
FIG. 25 is a cross section through line 25—25 in FIG. 24.

FIGS. 23 to 25 show the sub-process in which separate magnetic head elements are taken out through cutting. Each magnetic head element is obtained by cutting the magnetic head aggregates 71 and 72 at the positions indicated with the cutting lines X1 in FIG. 23.

Preferably, the first process should include a sub-process in which a plurality of magnetic head aggregates 71 and 72 are positioned parallel to each other. This will achieve an improvement in work efficiency. In that case, it is desirable that the second process include a sub-process in which a common mask 9 for the plurality of magnetic head aggregates 71 and 72 is positioned. The mask 9 may be constituted with film, resist or the like. The opening portions 91 and 92 of the mask can be formed through high precision pattern forming technology such as photo lithography.

While the invention has been particularly shown and described with reference to preferred embodiments thereof, it will be understood by those skilled in the art that various changes in form and detail may be made therein without departing from the spirit, scope and teaching of the invention.

What is claimed is:

1. A magnetic head comprising:

a slider, with two ends in the direction of the length thereof constituting a leading edge and a trailing edge, which is provided with at least one rail portion extending in said direction of said length at one surface; and at least one magnetic transducer which is provided on an extension of said rail portion toward said trailing edge of said slider, wherein;

said rail portion is provided with step-like indented portions provided along two sides thereof in the direction of the width;

said indented portions are formed shorter than said rail portion, thereby forming a rear rail surface toward said trailing edge of said slider, a front rail surface toward said leading edge of said slider and a middle rail surface between said rear rail surface and said front rail surface;

the surface width of said middle rail surface is maintained almost constant;

said rear rail surface and said front rail surface each include a first surface whose surface width is determined by the entire width of said rail portion and a second surface whose surface width is gradually reduced starting from said surface width of said first surface toward said surface width of said middle rail surface; and when the length of said first surface is designated L1, the length that includes said first surface and said second surface is designated L2 and the entire length of said rail portion is designated L0, L1≦2.5% of L0 and L1<L2≦15% of L0 are satisfied.

2. A magnetic head according to claim 1, wherein:

said length L1 of said first surface satisfies L1≧10 μm.

3. A magnetic read/write apparatus including a magnetic disk, a head support device, a positioning device and a magnetic head, wherein:

said magnetic disk is rotationally driven;

said head support device supports said magnetic head toward one end thereof;

said positioning device supports another end of said head support device and causes said magnetic head to rotate above the surface of said magnetic disk at a specific angle;

said magnetic head includes a slider and a magnetic transducer;

said slider, with two ends in the direction of the length thereof constituting a leading edge and a trailing edge, is provided with at least one rail portion extending in said direction of said length at one surface;

said magnetic transducer is provided on an extension of said rail portion toward said trailing edge of said slider;

said rail portions are provided with step-like indented portions provided along two sides in the direction of the width thereof;

said indented portion is formed shorter than said rail portion, thereby forming a rear rail surface toward said trailing edge of said slider, a front rail surface toward said leading edge of said slider and a middle rail surface between said rear rail surface and said front rail surface;

the surface width of said middle rail surface is maintained almost constant;

said rear rail surface and said front rail surface each include a first surface whose surface width is determined by the entire width of said rail portion and a second surface whose surface width is gradually reduced starting from said surface width of said first surface toward said surface width of said middle rail surface; and when the length of said first surface is designated L1, the length that includes said first surface and said second surface is designated L2 and the entire length of said rail portion is designated L0, L1≦2.5% of L0 and L1<L2≦15% of L0 are satisfied.

4. A magnetic read/write apparatus according to claim 3, wherein:

said length L1 of said first surface of said magnetic head satisfies L1≧10 μm.

* * * * *